United States Patent [19]

Lockwood

[11] 4,167,648
[45] Sep. 11, 1979

[54] ELECTRIC JUNCTION BOX

[75] Inventor: Alan C. Lockwood, Rosemead, Calif.

[73] Assignee: Norris Industries, Inc., Los Angeles, Calif.

[21] Appl. No.: 843,340

[22] Filed: Oct. 18, 1977

[51] Int. Cl.$^2$ ............................................. H02G 3/08
[52] U.S. Cl. .......................................... 174/53; 85/36; 151/41.75
[58] Field of Search .................... 174/53; 220/3.2, 3.3, 220/3.4, 3.5, 3.6, 3.7, 3.8, 3.9, 3.92, 3.94; 85/36; 151/41.75

[56] References Cited

U.S. PATENT DOCUMENTS

| | | | |
|---|---|---|---|
| 3,336,962 | 8/1967 | Foote, Jr. et al. | 41.75X |
| 3,876,821 | 4/1975 | Pringle | 174/53 |
| 3,926,330 | 12/1975 | Deming et al. | 220/3.9 |
| 3,955,463 | 5/1976 | Hoehn | 85/36 |

*Primary Examiner*—Roy N. Envall, Jr.
*Assistant Examiner*—Tone David A.
*Attorney, Agent, or Firm*—Edward A. Sokolski

[57] ABSTRACT

An electrical junction box particularly suitable for fabrication from molded plastic has a generally rectangular horizontal cross-section with a flat bottom wall, a pair of oppositely positioned flat side walls substantially parallel to each other, and a pair of end walls which are positioned opposite each other in a substantially parallel relationship, and which run between the edges of the side walls. A pair of hollow post members having a U-shaped lateral cross-section extend upwardly from opposite edges of the bottom wall along the opposite inner surfaces of the end walls. Each of these hollow post members has a bridge structure for supporting a fastener extending across the top thereof, this bridge structure having an aperture formed in its center for permitting the passage of an attachment screw. Slots are formed between opposite walls of the post members and the bridge structure, the arms of resilient fastener members being installed in the slots and retained therein by means of paired tabs which snap under shoulders formed in the walls of the post members. Sleeve receptacle members for receiving nails which can be used to attach the box to a wall stud or the like are formed along each of the end walls of the box, these sleeve members also operating as stiffeners. Knockout panels are formed in the end walls of the box to permit the passage of wires through these walls.

6 Claims, 9 Drawing Figures

ELECTRIC JUNCTION BOX

This invention relates to electrical terminal boxes, and more particularly to such a box suitable for fabrication from molded plastic.

The use of plastic material for fabricating electrical junction boxes and the like has the advantage of economy However, there has been some resistance in going to plastic boxes due to the feeling that plastic material would not have the necessary strength to withstand rough treatment in the field, particularly in colder climates where the plastic tends to become brittle. Also, plastic boxes tend to distort when they are stressed while being nailed to a stud, such that the centers of the fasteners used to mount the electrical outlet or the like are offset, making it difficult or impossible to mount this component. In many prior art boxes, the fastener nut or "quick set" members which receive the screws used for attaching the electrical outlet or other device to be mounted therein, are recessed well below the top edges of the box so that often it is found the screws available for such mounting are too short to make a proper attachment when the box is not mounted on the stud in an optimum position, which is difficult for an installer to consistently attain.

The device of the present invention provides an improved plastic molded electrical junction box which overcomes the aforementioned shortcomings of the prior art. In the box of the present invention, stiffening is provided on the end walls of the box, the stiffening means on the end walls also serving as receptacles for nails employed to attach the box to a wall stud, further stiffening being provided by posts which are also employed to retain fastener members at positions flush with the top edges of the box.

It is therefore an object of this invention to provide an electrical junction box suitable for molded plastic fabrication having improved strength characteristics.

It is another object of this invention to provide an electrical junction box wherein the attachment fasteners are securely mounted at the top edges of the box.

Other objects of the invention will become apparent as the description proceeds in conjunction with the accompanying drawings, of which:

Figure 1:
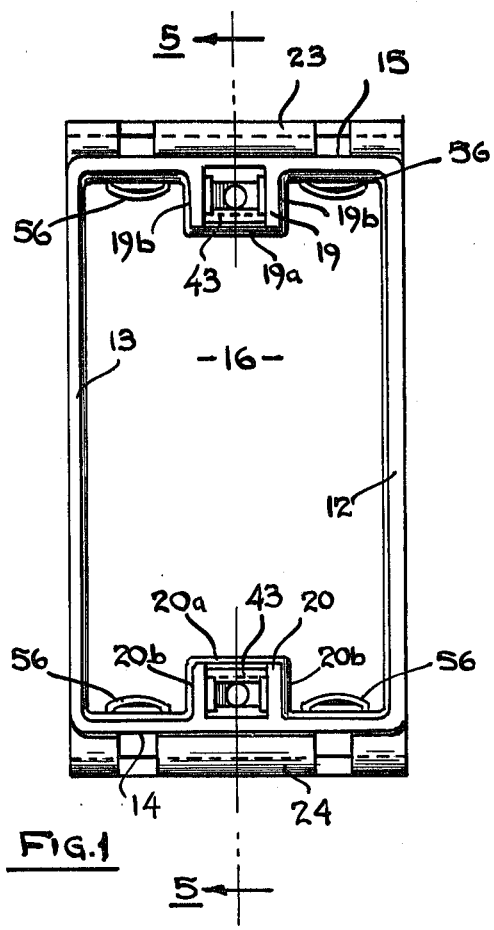
FIG. 1 is a top plan view of a preferred embodiment of the invention.
Figure 2:
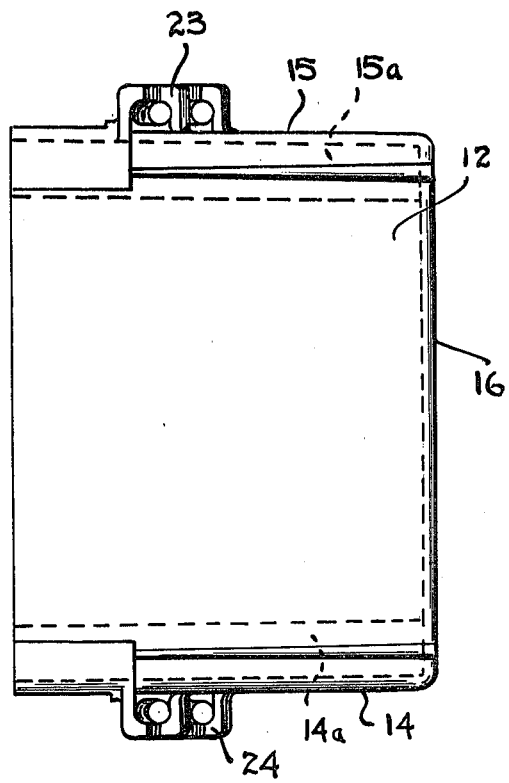
FIG. 2 is a side elevational view of the preferred embodiment.

Briefly described, my invention is as follows: A molded plastic electrical junction box has a generally rectangular horizontal cross-section with a pair of substantially parallel opposite side walls, a pair of substantially parallel opposite end walls joining the edges of the side walls together, and a bottom wall joining together the edges of the side and end walls, a substantially rectangular opening being left at the top of the box. A pair of substantially U-shaped posts are integrally formed with the end walls, these posts extending from the bottom wall to the top edges of the end walls. The lower portions of the posts form the lower central portions of the end walls, while the upper portions of the posts run along the upper portions of the end walls to provide stiffening therefor. Each of the posts has a bridge structure formed across the top portion thereof, this bridge structure being formed by a bridging element which runs across the top of its associated post with slots being formed between the opposite sides of said bridging element and the opposite legs of the "U" formed by the post. The bridging elements include central portions which are apertured to receive attachment screws, and end portions which rise above the central portion and form bar members which are proximate to the top edge of the box. A fastener is mounted on each bridging element, the fasteners having legs which are fitted in the slots and face portions mounted in a position substantially flush with the top edge of the box. A sleeve receptacle for receiving a nail for use in attaching the box to a stud extends fully across each of the end walls, these sleeve receptacles also functioning as stiffeners in conjunction with the upper portions of the posts. Knockout portions are provided at the bottom portion of the end walls to facilitate the formation of apertures through which wiring may be passed.

Referring now to FIGS. 1-5, a preferred embodiment of the invention is illustrated. The junction box has a pair of oppositely positioned side walls 12 and 13 which are substantially parallel to each other. A pair of oppositely positioned end walls 14 and 15 are positioned opposite each other and join the side edges of walls 12 and 13 together. The bottom edges of the side and end walls are joined together by a bottom wall 16 with the top of the box being left open. U-shaped post members 19 and 20, having arm portions 19*b* and 20*b* and back portions 19*a* and 20*a*, are formed along the inner surfaces of end walls 15 and 14 respectively, these post members running between bottom wall 16 and the top edges of the end walls. A pair of sleeve elements 23 and 24 extend diagonally across end walls 15 and 14 respectively. Walls 14 and 15 have longitudinal gaps at the central portions thereof (below sleeve elements 23 and 24), these gaps being bridged by the back walls 19*a* and 20*a* and the arm portions 19*b* and 20*b* of post members.

Figure 8:
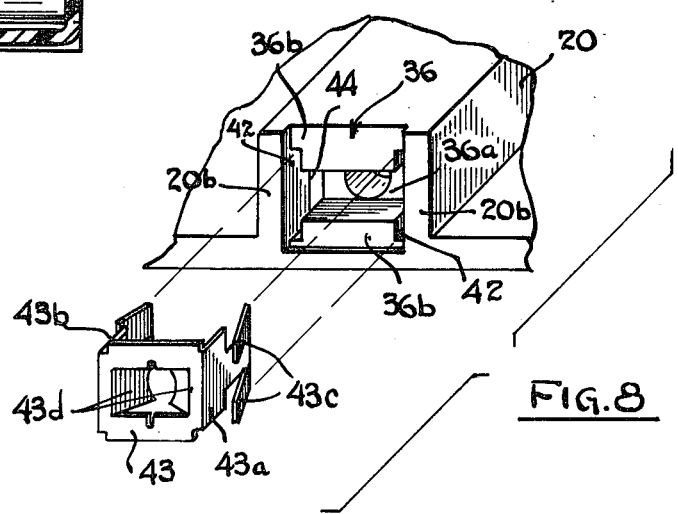
FIG. 8 is an exploded view illustrating the mounting of a fastener on the preferred embodiment.

Referring now additionally to FIG. 8, a bridging element 36 of the post 20 and its associated fastener 43 are shown in an exploded view. The bridging element 35 of post 19 is similar to bridging element 36. Bridging element 36 has a central portion 36*a* which has an aperture formed therein for receiving attachment screws or the like, and bar portions 36*b* which are stepped above portion 36*a*, the top surfaces of portions 36*b* being just slightly below the top edges of the box. Slots 42 are formed between bridge elements 36, and the arm portions 20*b* of the posts. Fasteners 43 are mounted along the top edges of posts 19 and 20 with the side arm portions 43*a* and 43*b* fitted in slots 42. In the installed position, tangs 43*c* of the fasteners snap into place in the recessed portions below shoulders 44 of the posts. Fasteners 43 have spring finger elements 43d between which a threaded screw can be engaged.

Figure 3:
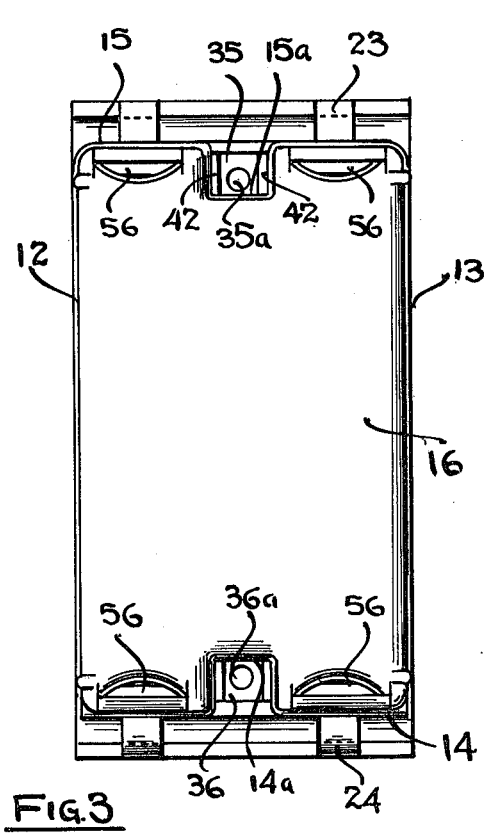
FIG. 3 is a bottom plan view of the preferred embodiment.
Figure 4:
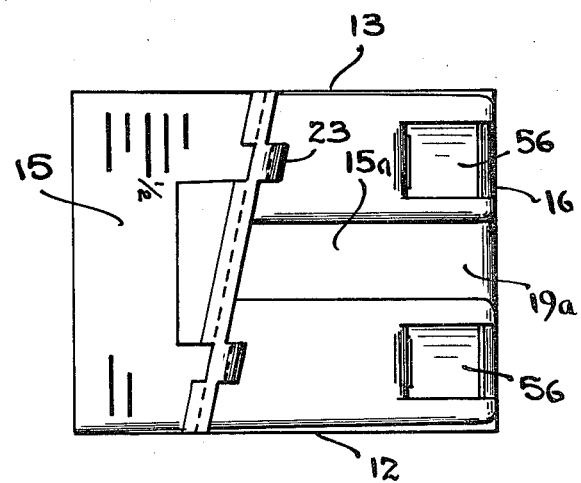
FIG. 4 is an end elevational view of the preferred embodiment.
Figure 5:
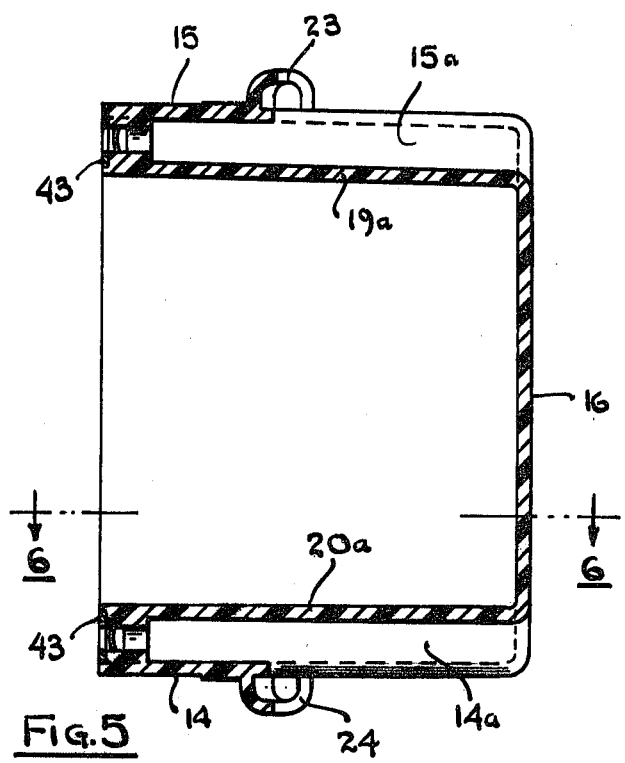
FIG. 5 is a cross-sectional view taken along the plane indicated by 5—5 in FIG. 1.
Figure 7A:
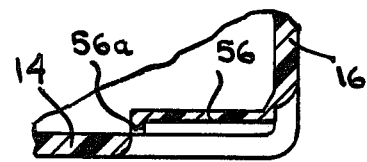
FIG. 7A is a cross-sectional view taken along the plane indicated by 7A—7A in FIG. 6.
Figure 7B:
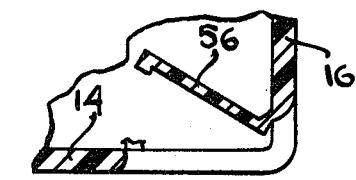
FIG. 7B is a partial cross-sectional view similar to that of FIG. 7A illustrating one of the knockout panels of the preferred embodiment in the process of being removed.
Figure 6:
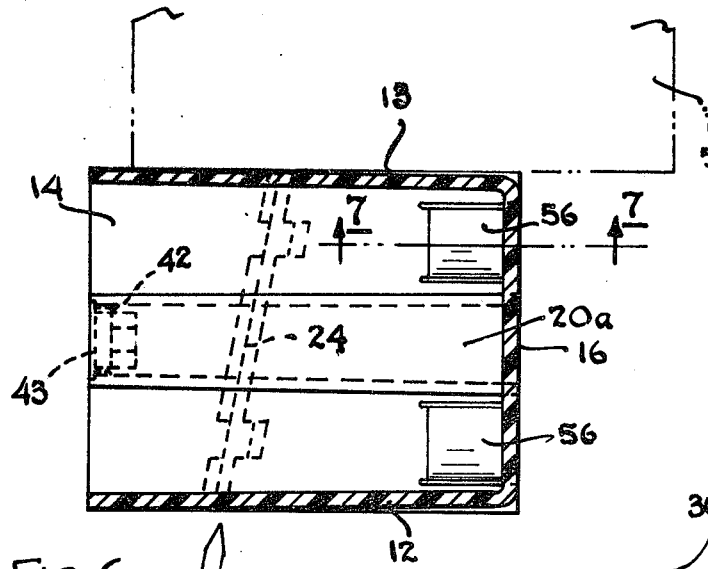
FIG. 6 is a view taken along the plane indicated by 6—6 in FIG. 5 and further illustrating the attachment of the device of the invention to a stud.

Referring now to FIG. 3, stiffening is provided along the side walls by sleeve receptacles 23 and 24, these receptacles each functioning to receive a nail 53 for attaching the box to a stud 54, as illustrated in FIG. 6. A plurality of knockout panels 56 are provided along the bottom of each of end walls 14 and 15. As can best be seen in FIGS. 7A and 7B, these knockout portions are slit along their side and top edges and are held to the walls only by corner webs 56a and to the bottom of the box along the bottom edges thereof. Thus they can be readily removed with a screwdriver or other tool as shown in FIG. 7B to permit the insertion of a cable into the box.

The device of the present invention thus is an improved terminal box suitable for plastic molded fabrication, having improved strength and stability characteristics, and more reliable and more accessible fastening means for use in mounting components.

While the invention has been described and illustrated in detail, it is to be clearly understood that this is intended by way of illustration and example only and is not to be taken by way of limitation, the spirit and scope of this invention being limited only by the terms of the following claims.

I claim:

1. In an electrical junction box having a pair of oppositely positioned flat side walls, a pair of oppositely positioned end walls, a bottom wall and a substantially rectangular open top, a substantially U-shaped post member formed along the inner surface of each of said end walls with the ends of the arms of the U's abutting against said end walls, on end of each of said post members extending to the top edge of the associated end wall, each of said post members having a bridging element running across said one end thereof, each of said bridging elements including a central apertured portion and bar portions on opposite sides of said apertured portion, said bar portions stepped upwardly from said central portion to positions proximate to the top edge of the associated end wall, a pair of slots being formed between said central and bar portions and the arms of the "U" formed by said post member, said slots running substantially normal to said bar portions, and a fastener fitted into the bridging elements of each of said post members, each of said fasteners having a pair of side leg portions fitted into said slots and a face portion fitted over the central and bar portions of the bridging element.

2. The junction box of claim 1 and further including sleeve receptacle means for receiving a nail extending fully across each of said end walls to provide stiffeners for said walls.

3. The junction box of claim 2 wherein the lower portions of said post members form lower central portions of said end walls.

4. The junction box of claim 1 wherein each of the leg portions of said fasteners has a pair of tangs formed therein, said post members having inner shoulders formed therein against which said tangs engage.

5. The junction box of claim 1 and further including knockout panel portions formed in said end walls, said panel portions having bottom edges attached to the bottom wall and webs at the corners thereof for holding the panels to the end walls.

6. The junction box of claim 1 wherein the bridging elements run substantially in the same directions as their associated post member arms, the slots separating the bridging elements from the arms.

* * * * *